United States Patent [19]

Schönhausen

[11] Patent Number: 4,585,353

[45] Date of Patent: Apr. 29, 1986

[54] APPARATUS FOR THE PREPARATION AND APPLICATION IN SITU OF BLENDS OF STRUCTURAL MATERIAL

[76] Inventor: Horst Schönhausen, Im Staubenweidli 9, CH-8820 Wädenswil, Switzerland

[21] Appl. No.: 593,367

[22] Filed: Mar. 26, 1984

[30] Foreign Application Priority Data

Mar. 26, 1983 [CH] Switzerland ............... 1635/83

[51] Int. Cl.$^4$ ............................................. B28C 5/08
[52] U.S. Cl. ........................................ 366/11; 366/5; 366/16; 366/50; 366/196
[58] Field of Search ............... 366/3, 5, 10, 11, 13, 366/27, 33, 34, 40, 50, 51, 65, 16, 76, 186, 190, 196, 194, 195

[56] References Cited

U.S. PATENT DOCUMENTS

| | | | |
|---|---|---|---|
| 1,829,479 | 10/1931 | Elkins | 366/76 |
| 1,954,005 | 4/1934 | Westberg | 366/11 |
| 2,887,719 | 5/1959 | Corbett | 366/76 |
| 3,843,100 | 10/1974 | Haas | 366/76 |
| 4,223,996 | 9/1980 | Mathis | 366/27 |
| 4,298,288 | 11/1981 | Weisbrod | 366/27 |
| 4,440,499 | 4/1984 | Tomikawa | 366/10 |

OTHER PUBLICATIONS

Uelzener Maschinenfabrik, Friedrich Maurer GmbH, D-6231 Sulzbach/Taunus, Germany, 1981.

Primary Examiner—Robert W. Jenkins

Attorney, Agent, or Firm—Heinrich W. Herzfeld

[57] ABSTRACT

A process for the preparation and immediate use in situ of ready to use blends of structural material, such as plaster, mortar, stucco, tile adhesive or similar blends, which, in contrast to the usual methods does not use as a raw material a dry mixture of the three main components binder, filler and additives. Instead a dry mix of binder and filler is prepared at the building site, and an aqueous solution of the additives is added in a separate mixing operation, immediately followed by the application in situ of the finished blend. This method avoids the difficulties associated with the use of dry mixtures containing all three components. The invention includes an apparatus for mixing and immediate application of the blends as defined by the process claims.

In an especially advantageous form of the invention, part of the aqueous solution of additives is added to the rest of the blend, after mixing and preferably at a point situated between the conveyor pump and the transport hose, in the form of a cylindrical thin concentric mantle surrounding a core of the wet blend. Much of the friction between the structural blend and the transport conduit can thus be avoided, as well as the wear associated with it. The application of the structural blend can be assisted by pressurized air injected into the stream upstream of the applicator nozzle. The stream of air may be loaded with airborne particles of silicone solution in order to impart water repellency to the structural layers made by the process.

4 Claims, 3 Drawing Figures

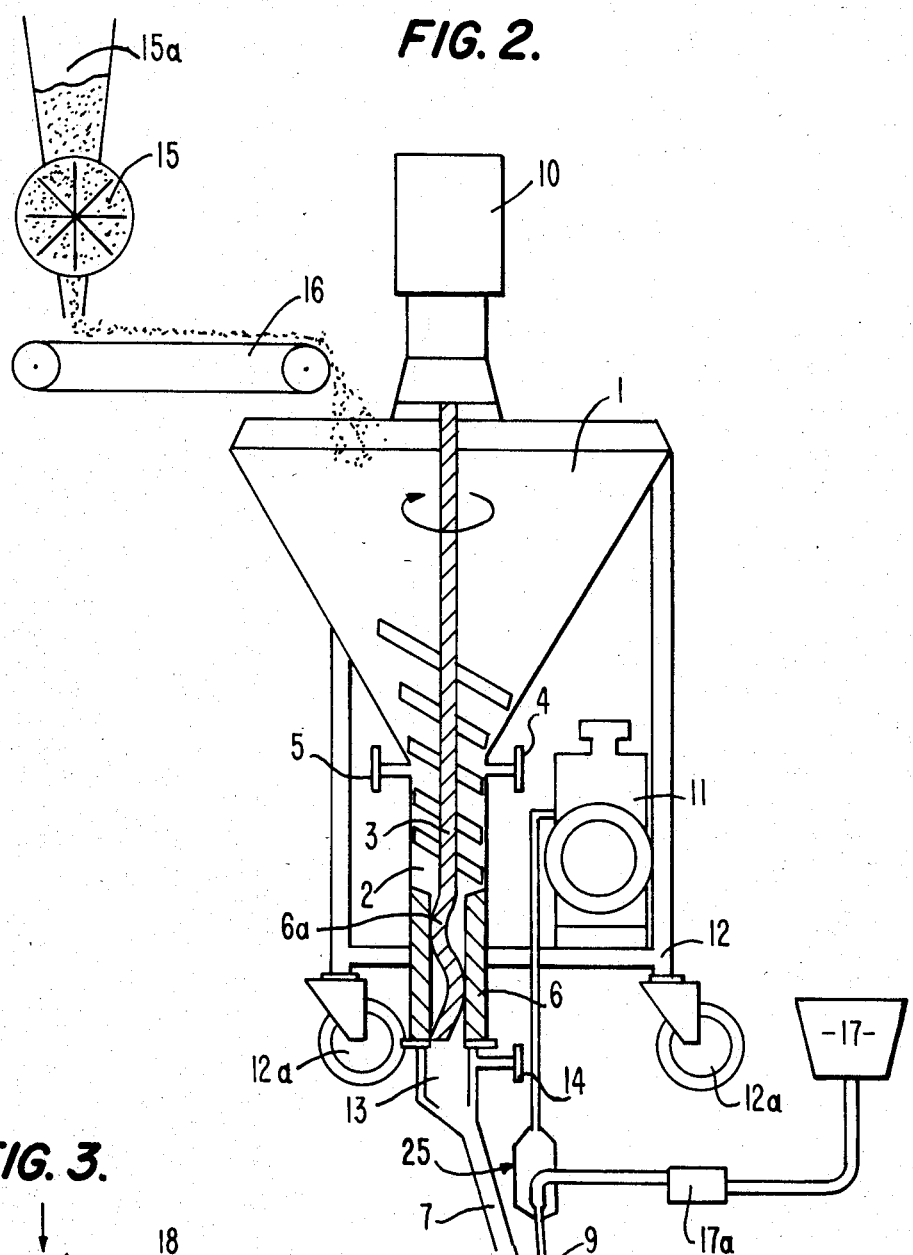
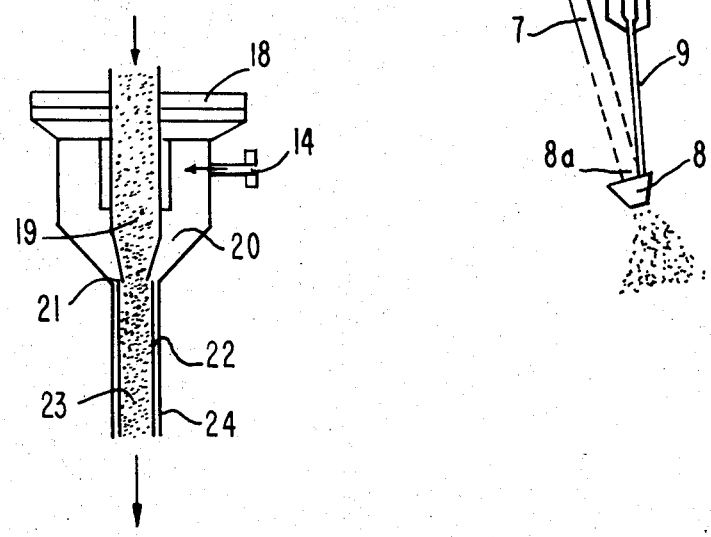
FIG. 2.
FIG. 3.

APPARATUS FOR THE PREPARATION AND APPLICATION IN SITU OF BLENDS OF STRUCTURAL MATERIAL

BACKGROUND OF THE INVENTION

This invention relates to a process for the preparation and application in situ of a ready to use blend of structural material, the constituents of which blend comprise binder, filler additive and water.

Structural elements according to the invention are mortar or plaster for joining bricks, coating masses for walls, floors and ceilings, joining masses to fill out gaps and adhesives for tiles and similar structural elements. Powdered or granulated dry mixtures from which ready to use blends of structural material can be made by simply mixing them with water are well known and commercially available. Such dry mixtures basically consist of three main components:

- binders, i.e. dry substances which, by chemical and/or physical reaction with water turn into a coherent dry mass;
- fillers which by themselves do not react with water but are embedded into the binder mass, thus giving additional volume, and which may improve the physical strength and, if desired, thermal or sonic insulation properties of the mass;
- Additives, principally meant to improve the physical properties of the wet blend, such as its fluidity, water retention power and setting speed, but in some cases also to influence properties of the hardened material, such as water repulsion or pore volume.

Well-known binders for structural materials are cement, gypsum, quick lime, magnesite or mixtures of them. Commonly used fillers are sand, powdered rock, crushed marble or dolomite, ground slag, fly ash, clay and china clay. Furthermore porous materials like expanded baked clay or foamed polystyrene may be used to improve thermal or sonic insulating power. Additives, usually representing at most 3% by weight, preferably less than 1% by weight of the structural blend as applied, are mainly natural or synthetic polymers such as animal or vegetable glue, alginates, soluble starch ethers, cellulose derivatives such as carboxymethyl cellulose, polyvinyl alcohol, derivatives of polyacrylic acid, e.g. polyacryl amide. Another class of additives are surfactants such as fatty acid esters and sulfonates, alkyl aryl sulfonates, lignin sulfonates and soaps. Still another class, mainly used as setting retardants, are certain acids such as tartaric acid, citric acid or maleic acid. Silicones, which are soluble in organic solvents or mixtures of water and organic solvents can be used to improve the water repellency of the structural surfaces.

Part of the additives referred to above are hygroscopic. This means that mixtures containing them are difficult to keep dry and therefore have to be protected by expensive packaging. Broken packages, especially on building sites may rise extra problems. Structural blends containing as little as 1% by weight of water will already harden in a short time and thus become useless.

Another kind of problem originates in the use of a certain type of machines frequently used in the building industry. Such machines as the well known spray rendering or spray plaster machine serve to handle large quantities of structural blends by mixing and immediately applying them on the building site. These machines usually comprise a mixing chamber with a filling hopper for the dry mixture and a device for water dosage into the mixing chamber. The mixing chamber is connected to a conveyor pump which transports the wet blend via a hose to a nozzle for the application in situ. These machines may work batchwise or preferably in a continuous mode. In both cases the mixing has to be very rapid in order to avoid any interruption in the feeding of the applicator nozzle. Normally only 6 to 20 seconds are available for the complete process of mixing the dry blend with water.

One drawback of the prior art is the high standard of effectiveness for the mixing device: On the one hand the initial dryness of the material requires a very high energy input, resulting also in high wear on the machine parts. On the other hand, on account of the small concentration of additives, an exceptionally high standard of homogeneity of the mixture is required. Additional problems arise by the low rate of dissolution of high molecular additives, such as carboxmethyl cellulose or polyacryl amide, especially if they are present in granulated form. In many cases the time available for mixing does not suffice for complete dissolution of the additives. To overcome this problem the dissolution rate has to be increased by fine grinding or by special treatment of the additive, or even compensated by overdosage, which, of course, is not economical.

A method of sealing and strengthening of a cracking and deteriorating wall surface, by mixing dry plaster of Paris with the necessary amount of water in a nozzle through which the mixture is sprayed onto the surface has been described in German Offenlegungsschrift No. 2,733,540 by Walter D. Kobeski (U.S. patent application Ser. No. 709,699 filed July 29, 1976).

In the Swiss patent No. 595 065 a technique is described, by which the problems associated with slow dissolution of high molecular additives can be overcome. This is achieved by adding the additives in the form of an aqueous dispersion, in which they are present in the form of very fine solid particles. The aqueous phase of the dispersion contains dissolved salts or organic solvents in order to prevent the dispersed phase from being dissolved. Such dispersions exhibit the advantage of low viscosity compared with aqueous solutions of corresponding concentration. However, as the salts and organic solvents cannot be removed during the mixing process and thus remain in the finished mixture, they still impair the complete dissolution of the additives. The problem of poor utilisation of the additives therefore still remains unsolved.

OBJECTS AND SUMMARY OF THE INVENTION

It is therefore an object of this invention to ensure complete dissolution of all additives in the final blend by dissolving them in water, prior to mixing them with the other constituents of the blend.

It is another object of the invention to provide a process for complete and homogeneous mixing of all components and dissolution of all additives with a machine of relatively low mixing power. This is achieved by premixing the binder and filler components in a separate machine and by adding the additives in the form of an aqueous solution. Excessive wear on the machine parts of the mixing chamber can thus be avoided.

It is still another object of the invention to provide a process for preparing ready to use blends of structural material and applying them in situ, whereby the transport hose and application nozzle are protected against excessive wear by a liquid mantle of lubricating liquor surrounding concentrically the wet structural material during its transport through the hose.

It is a further object of this invention to provide a process for the preparation of ready to use blends of structural material, whereby, through the use of separate components instead of a dry premix of the whole blend, the requirements of protection against humidity are circumscribed to the binder component alone.

It is still another object of this invention to provide an apparatus by which the process for preparation and application in situ of ready to use blends of structural material, according to the invention, can be accomplished.

The process of the present invention does not use, as a starting material, a complete dry mixture of the three components binder, filler and additive. Instead, all three components are delivered separately to the building site. Binders and fillers are used in dry, powdered or granulated form, whereby precautions against humidity have only to be observed for the binder component. The additives are delivered in the form of an aqueous solution. The concentration of this solution is determined on the one hand by the desired composition of the final blend and on the other hand by the viscosity of the solution, which should not be so high as to interfere with its easy handling.

The process begins with a premixing operation of the binder and filler components. This, because the operation is not bound to any simultaneous output requirements, can be done at leisure by any simple mixing equipment. Care must only be taken, that the total time of mixing and storage of the premix is less than the time needed for a reaction of the binder component with any trace of humidity present in the premix.

In a second process step which is carried out separately and in another machine, the dry mixture of binder and filler is batchwise or continuously mixed with the aqueous solution of the additives, after which, as in the known machines of this type, the mixture is directly transported and applied in situ by any known equipment, preferably by a conveyor pump, connected to the mixing chamber of the machine and discharging into a hose with a nozzle at its far end. Supplemental water can be added into the mixing chamber when the concentration of the aqueous additive solution is too high for the desired composition of the final blend. Indeed, by metering a relatively concentrated solution of additive and supplemental water into the mixing chamber, the composition of the final blend can be varied without changing the composition of the additive solution.

Typical compositions for blends of structural material as they are made by the process of this invention correspond to weight proportions of binder and filler between 5 to 95 and 99 to 1, and to proportions of total solids and water between 90 to 10 and 67 to 33, all proportions being by weight. The fraction of the additives in a typical blend is between 0.01 and 3 percents by weight of the total mass of the blend.

Very advantageously, a small part of the aqueous additive solution can be used as a lubricating agent during the transport of the wet structural blend from the mixing chamber to the application point. To achieve this, a concentric extrusion nozzle is mounted at one point between the mixing chamber and the transport hose, preferably at the dicharging point of the conveyor pump into the transport hose. Part of the additive solution is introduced peripherally into this nozzle, where it is forming a liquid cylindrical mantle surrounding concentrically the extruded core containing the rest of the wet structural blend. This mantle serves as a lubricating layer, reducing the power needed to transport the wet blend through the transport hose and protecting the latter against excessive wear.

While remaining separate from the core of the moving wet structural blend during its way through the hose, this concentric liquid mantle is rapidly mixed with the bulk of the blend when it reaches the zone of high turbulence at the mouth of the applicator nozzle.

Aqueous polyacrylic amide solutions having a concentration of from 1 to 10 grams per liter of water (0.1 to 1% by weight) and a viscosity of these solutions ranging from about 100 to 3500 centipoises are preferred as polyacrylic amide derivatives.

Preferred silicones in the blend of structural materials produced by the process of the invention are Wacker 290 L and BS 20 whose physical data and characteristics are described on the pamphlets issued by Wacker Chemie GmbH, D-8000 München 22, Germany in October 1982. The contents of these two pamphlets, photostatic copies of which are attached hereto, are also made a part of the instant disclosure.

Certain other additives have been disclosed in Swiss patent No. 574 372 by Hoechst AG, D-6000 Frankfurt am Main, Germany, in Germany, in Swiss patent No. 599,065 by Sika AG, Zürich, Switzerland, and in Swiss patent No. 633 239, also by Hoechst AG, supra.

An apparatus, similar to the well known spray plaster machine but comprising additional devices to adapt it to the process of the invention is also an object of this invention. The apparatus according to the invention comprises a filling hopper, into which the dry mixture of binder and filler is fed by a metering device, a mixing chamber for mixing the dry premix of binder and filler with the aqueous solution of additives and, if necessary, additional water, a conveyor pump transporting the wet blend into a hose and, at the far end of the hose, an applicator nozzle. An inlet and metering device for the aqueous additive solution and optionally a second inlet and metering device for supplemental water are connected to the mixing chamber.

A concentric extrusion nozzle, serving to generate a cylindric liquid mantle of additive solution around a core of the wet structural blend is optionally mounted between the outlet of the conveyor pump and the upstream end of the tranpsort hose.

Near the far end of the hose an inlet for pressurised air may optionally be mounted to allow the spraying function of the nozzle to be assisted by pressurised air. A spray nozzle, serving to atomize a silicone solution and introduce the stream of fine silicone particles into the stream of pressurised air may further be mounted optionally.

BRIEF DESCRIPTION OF THE DRAWINGS

FIG. 2 shows a schematic representation of a preferred embodiment of the preparation and application apparatus according to the invention.

FIG. 3 shows a schematic representation of a concentric extrusion nozzle adapted for being mounted between the conveyor pump and the hose in the embodiment of FIG. 2.

DETAILED DESCRIPTION OF THE EMBODIMENTS SHOWN IN THE DRAWINGS

Figure 1:
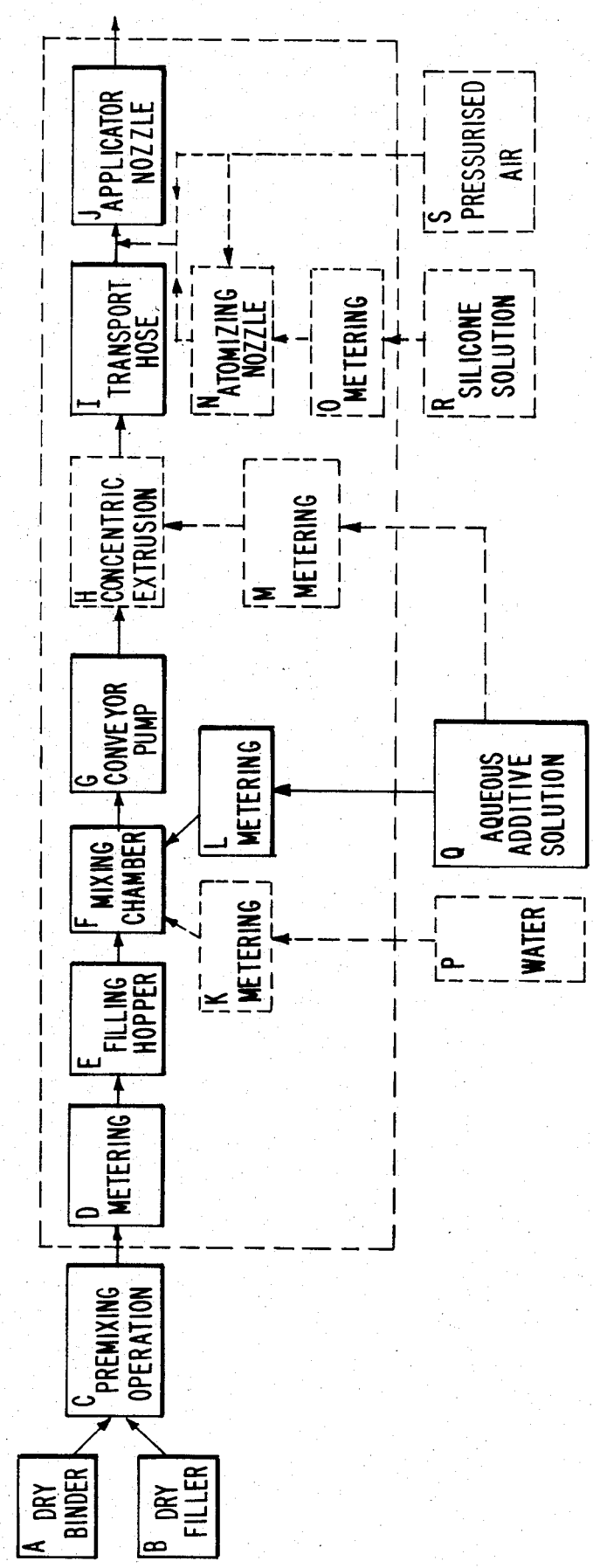
FIG. 1 shows a flow diagram for the process of preparation and application in situ of ready to use blends of structural material according to the invention.

In the flow diagram of FIG. 1 the process according to the invention is shown schematically. Optional steps of the process are represented by dotted lines. The dashed frame surrounding part of the process steps represents the range of steps that can be carried out by the apparatus of FIGS. 2 and 3.

Dry binder A and dry filler B are premixed in step C. The dry premix is delivered through the metering station D to the filling hopper E and from there to the mixing chamber F. Aqueous additive solution Q and optionally water P are metered by the respective devices L and K into the mixing chamber F. The wet blend is taken by the conveyor pump G and further transported either directly to the transport hose I or optionally first to the concentric extrusion nozzle H, where it is surrounded by a liquid concentric mantle of supplemental addditive solution Q, metered into the concentric nozzle by the device M. Through the transport hose I the wet blend is dispatched to the applicator nozzle J. Pressurised air S is optionally fed to a point immediately upstream of the applicator nozzle to assist the spraying action of the nozzle. A silicone solution R may optionally be fed to the same point by the metering device O and the atomizing nozzle N.

Referring now to FIG. 2, which is a schematic representation of the apparatus for the preparation and application in situ of blends of structural material according to the invention, the dry mix of binder and filler, which has been prepared in a mixing device not shown in the drawing, is filled into the hopper 15a of the metering device 15, from where it falls onto the conveyor belt 16 and is transported into the filling hopper 1. From there it is fed into the mixing chamber 2 by the stirring device 3. An aqueous additive solution is fed into the mixing chamber through inlet 4, which is connected to a metering device not shown in the drawing. Another inlet 5 serves to feed supplemental water, if needed, into the mixing chamber 2. This inlet 5 is also connected to a metering device not shown in the drawing. From the mixing chamber 2 the wet blend falls into the conveyor pump 6, which may be a screw pump as intimated by the drawing, or any other type of pump suitable for transporting thick slurries. The conveyor pump 6 presses the wet blend into the transport hose 7, by way of which it is transported to the applicator nozzle 8. Pressurised air, delivered by the compressor 11 may optionally be delivered by a conduit 9 to a point 8a situated immediately upstream of the applicator nozzle 8.

A concentric extrusion nozzle 13 may optionally be mounted between the pump 6 and the hose 7. In this nozzle 13 a thin concentric mantle of supplemental additive solution can be formed by feeding this solution into an inlet 14. As shown in the drawing the entire apparatus is mounted on a solid frame 12 which may be mobile by mounting it on rollers 12a. The stirrer 3 and the shaft 6a of the conveyor pump 6 are preferably aligned in such a way that they can be driven by the same motor 10, mounted on top of the filling hopper 1.

The apparatus may be operated either in a batch process or in a continuous mode. When operated batchwise, a predetermined quantity of the dry premix of binder and filler is fed into the filling hopper 1 and from there falls into the mixing chamber 2. A predetermined amount of aqueous additive solution is fed in through the inlet 4, as well as a predetermined quantity of water, which is optionally fed in through the inlet 5. After thorough mixing the wet blend is fed to the pump 6, by which it is pressed through the hose 7 to the applicator nozzle 8.

Preferably the apparatus is operated in a continuous mode, thus avoiding any interruption of the flow of material out of the applicator nozzle 8. In this case the dry premix of binder and filler is metered continuously by the metering device 15 via the conveyor 16 into the filling hopper 1, from where it is moved in a continuous stream through the mixing chamber 2 and the conveyor pump 6 to the hose 7 and finally to the applicator nozzle 8, from which it is applied to its point of use. An aqueous additive solution, optionally water and optionally a further amount of additive solution are continuously metered and fed in through the respective inlets 4, 5 and 14. Silicone solution from a vessel 17 is fed via a metering device 17a to an atomizing nozzle 25 mounted in the compressed air conduit 9 upstream of the point 8a at which compressed air is delivered to the applicator nozzle 8.

In FIG. 3 the concentric extrusion nozzle 13 is represented in a detailed manner. The device is connected through the flange 18 to the outlet tube of the conveyor pump 6. The wet blend of structural material flows into the inner tube 19 of the concentric extrusion nozzle 13. Aqueous additive solution is metered through the inlet tube 14 into the annular chamber 20, which surrounds the inner tube 19. At the point 21 a thin cylindric liquid mantle 22 of additive solution forms concentrically around the core 23 of the wet blend. Both the mantle and the core are transported further through the outlet tube 24 to the transport hose 7, leading to the applicator nozzle 8.

Having now explained the process according to the invention and the apparatus by which it can be performed, the following examples may further illustrate the process, without restricting the same in any way. All parts and percentages given in the examples are calculated by weight, unless expressly stated otherwise.

EXAMPLE 1

A dry mixture of
70 parts of sand,
20 parts of Portland cement and
10 parts of quick lime
is prepared in a separate mixing device not shown in the drawings. This mixture is filled into the hopper 1 of the apparatus shown in FIG. 2. The mixing device 3 and the screw pump 6 are set in motion, while at the same time
20 parts of an aqueous solution containing
   1% of cellulose hydroxypropyl methyl ether* and
   0.1% of polyacryl amide**
are metered in through the inlet 4. After 12 seconds of mixing time the ready to use spray plaster mass can be applied from the applicator nozzle 8. The preparation produced by the apparatus proves to be homogeneously mixed, normally workable and of excellent water retention. The latter is examined by squeezing a fresh sample taken from the applicator nozzle 8, with the palm of the hand. No visible separation of sand from the water and cement should take place.

*viscosity 75 000 cP at a concentration of 2% in water at room temperature.
** 30% of the amide groups hydrolized visvosity 200 cP at a concentration of 0.1% at room temperature

EXAMPLES 2 to 6

The spray plaster mixture with the composition in parts by weight as indicated in example 1 is repeated in a series of further experiments, wherein the concentration of additives is lowered stepwise:

| Example Number | 2 | 3 | 4 | 5 | 6 |
|---|---|---|---|---|---|
| sand | 70 | 70 | 70 | 70 | 70 |
| Portland cement | 20 | 20 | 20 | 20 | 20 |
| quick lime | 10 | 10 | 10 | 10 | 10 |
| aqueous additive solution containing | 20 | 20 | 20 | 20 | 20 |
| cellulose ether % | 0.8 | 0.7 | 0.6 | 0.5 | 0.4 |
| polyacryl amide % | 0.08 | 0.07 | 0.06 | 0.05 | 0.04 |
| workability and water retention | good | good | good | good | not suffic. |

The concentration of 0.5% cellulose ether and 0.05% polyacrylamide in the aqueous solution is therefore the lower limit, below which the workability of the plaster mixture and its water retention are no longer satisfactory.

EXAMPLE 7

Using an apparatus as shown in FIG. 2, which is equipped with an air compressor connected via a conduit 9 to an inlet 9a of the transport hose 7, situated immediately upstream of the applicator nozzle, the process of example 1 is repeated, while injecting a stream of pressurised air into which a solution of 1 part of an oligomer organosiloxane, such as the product sold under the trade name "Wacker 290 L", in
9 parts of ethyl alcohol had been introduced by way of an atomizing nozzle, not shown in FIG. 2. The amount of silicone solution to be used varies with the thickness of the plaster layer to be applied. A good degree of water repellency will be obtained by using between 0.1 and 1.0 grams of silicone solution for 1 square meter of the treated surface.

EXAMPLE 8

In an apparatus according to FIG. 2, into which a concentric extrusion nozzle 13 as shown in FIG. 3 has been mounted between the outlet of the conveyor pump 6 and the transport hose 7, a mixture of 70 parts of sand,
20 parts of Portland cement and
10 parts of quick lime is fed continuously by the metering device 15 and the conveyor 16 into the filling hopper 1, while simultaneously an aqueous solution containing 1 g of cellulose hydroxypropylmethyl ether and
0.1 g of partly (30%) hydrolized polyacryl amide per 100 g of solution is fed through the inlet 4 into the mixing chamber 2 in a proportion of 14 parts by weight for 100 parts of the dry mixture. At the same time water is fed continuously through the inlet 5 into the mixing chamber 2 in a proportion of 2 parts for 100 parts of the dry mixture.

An addititional 6 parts of the aqueous solution containing 1% of cellulose hydroxypropylmethyl ether and 0.1% of polyacryl amide are fed into the peripheral inlet 14 of the concentric extrusion nozzle 13, from which the plaster mixture is flowing into the transport hose 7 having an inner diameter of 35 mm. An inner core 23 of wet plaster mixture is forming at the outlet 19a of the extrusion nozzle 13, where it is surrounded by a concentric liquid mantle 22 of the aqueous additive solution pumped into the peripheral inlet 14 of the extrusion nozzle 13. The thickness of the liquid mantle is about 0.65 mm at the outlet 19a of the concentric extrusion nozzle 13, diminishing somewhat along the hose 7 by partly mixing with the core 23.

A known spray plaster machine is illustrated in a pamphlet issued by Uelzener Maschinenfabrik Friedrich Maurer GmbH in D-6231 Sulzbach/Taunus, Germany in 1981. This type of machine can be adjusted for carrying out the process according to the invention without change of the performance data given in the pamphlet.

The same is true for the plastering machine described in two pamphlets entitled "Symtec ml Nos. M 326/4 and M 326/5 published by Symtec Mathis System-Technik GmbH, of D-7844 Neuenburg, Germany in July 1983.

Photostatic copies of these three pamphlets are incorporated in the instant specification, and the technical data described in these three pamphlets are hereby made a part of the instant disclosure.

I claim:

1. An apparatus for the preparation and application in situ of a blend of structural material, comprising a filling hopper, a mixing chamber, a mixing element in said chamber, conveyor means comprising a conveyor pump and a transport hose line, a metering device for the premixed dry blend of binder and filler;

first inlet means for aqueous additive solution, an additive-solution metering device being connected with said mixing chamber via said first inlet means;
second inlet means for additional water, connected to the mixing chamber, a metering device for said additional water; and
at a point downstream of the conveyor pump, a concentric extrusion nozzle comprising a central inlet tube for the wet blend arriving from the mixing chamber, an annular chamber surrounding the central inlet tube, a peripheral inlet connected to said annular chamber; an extrusion zone in which said surrounding annular zone and said central inlet tube meet concentrically, and a common outlet tube.

2. The apparatus of claim 1, in which the concentric extrusion nozzle is located at a point between the conveyor pump and the transport hose line.

3. The apparatus of claim 1, further comprising an applicator nozzle and a conduit for pressurised air having an inlet being connected to a point of said transport hose line immediately upstream of said applicator nozzle.

4. The apparatus of claim 3, further comprising an atomizing device for a silicone solution, connected to said conduit of pressurized air at a point thereof situated upstream of said inlet for pressurized air into said transport hose line.

* * * * *